(12) United States Patent  
Chung et al.

(10) Patent No.: US 9,052,625 B2  
(45) Date of Patent: Jun. 9, 2015

(54) METHOD OF CONTINUOUSLY FORMING AN AQUEOUS COLORANT DISPERSION USING A SCREW EXTRUDER

(71) Applicant: Xerox Corporation, Norwalk, CT (US)

(72) Inventors: Joo T. Chung, Webster, NY (US); Chieh-Min Cheng, Rochester, NY (US); Steven M. Malachowski, East Rochester, NY (US); Eric David Godshall, Macedon, NY (US); Jim Lee Pearson, Waterloo, NY (US)

(73) Assignee: XEROX CORPORATION, Norwalk, CT (US)

(*) Notice: Subject to any disclaimer, the term of this patent is extended or adjusted under 35 U.S.C. 154(b) by 20 days.

(21) Appl. No.: 13/840,499

(22) Filed: Mar. 15, 2013

(65) Prior Publication Data

US 2014/0261083 A1 Sep. 18, 2014

(51) Int. Cl.

| | |
|---|---|
| *B29B 7/00* | (2006.01) |
| *B01F 13/00* | (2006.01) |
| *G03G 9/09* | (2006.01) |
| *B01F 7/00* | (2006.01) |
| *B01F 15/02* | (2006.01) |
| *C09B 1/00* | (2006.01) |
| *G03G 9/08* | (2006.01) |

(52) U.S. Cl.  
CPC .......... *G03G 9/0926* (2013.01); *B01F 7/00416* (2013.01); *B01F 15/0216* (2013.01); *C09B 1/00* (2013.01); *G03G 9/0812* (2013.01)

(58) Field of Classification Search  
CPC .................................................. B01F 15/0216  
USPC .................... 366/20, 76.4, 76.9, 83  
See application file for complete search history.

(56) References Cited

U.S. PATENT DOCUMENTS

| | | | | |
|---|---|---|---|---|
| 3,684,419 | A | * | 8/1972 | Voight ...................... 425/192 R |
| 5,191,537 | A | * | 3/1993 | Edge ............................. 700/196 |
| 5,556,727 | A | | 9/1996 | Ciccarelli et al. |
| 7,225,920 | B2 | * | 6/2007 | Hoeffkes et al. ............. 206/222 |
| 8,207,246 | B2 | * | 6/2012 | Faucher et al. ............... 523/336 |
| 8,608,367 | B2 | * | 12/2013 | Chung et al. .................... 366/81 |
| 2008/0138738 | A1 | | 6/2008 | Chung et al. |
| 2008/0138739 | A1 | * | 6/2008 | Chung et al. ............. 430/137.14 |
| 2011/0196066 | A1 | | 8/2011 | Faucher et al. |

* cited by examiner

*Primary Examiner* — Tony G Soohoo  
*Assistant Examiner* — Anshu Bhatia  
(74) *Attorney, Agent, or Firm* — Pillsbury Winthrop Shaw Pittman LLP

(57) ABSTRACT

A continuous process for making a pigment dispersion includes continuously feeding a pigment into a feed section of a screw extruder at a controlled rate, continuously feeding a surfactant into the feed section of the screw extruder at a controlled rate, continuously feeding water downstream of the feed section to emulsify the pigment and the surfactant, forming a water-in-pigment dispersion, continuously feeding additional water downstream of the previously fed water to cause a phase inversion of the water-in-pigment dispersion, forming a pigment-in-water dispersion, continuously homogenizing the pigment-in-water dispersion in the screw extruder to create a homogenous aqueous pigment dispersion and collecting the homogenous aqueous pigment dispersion from an exit section of the screw extruder.

20 Claims, 1 Drawing Sheet

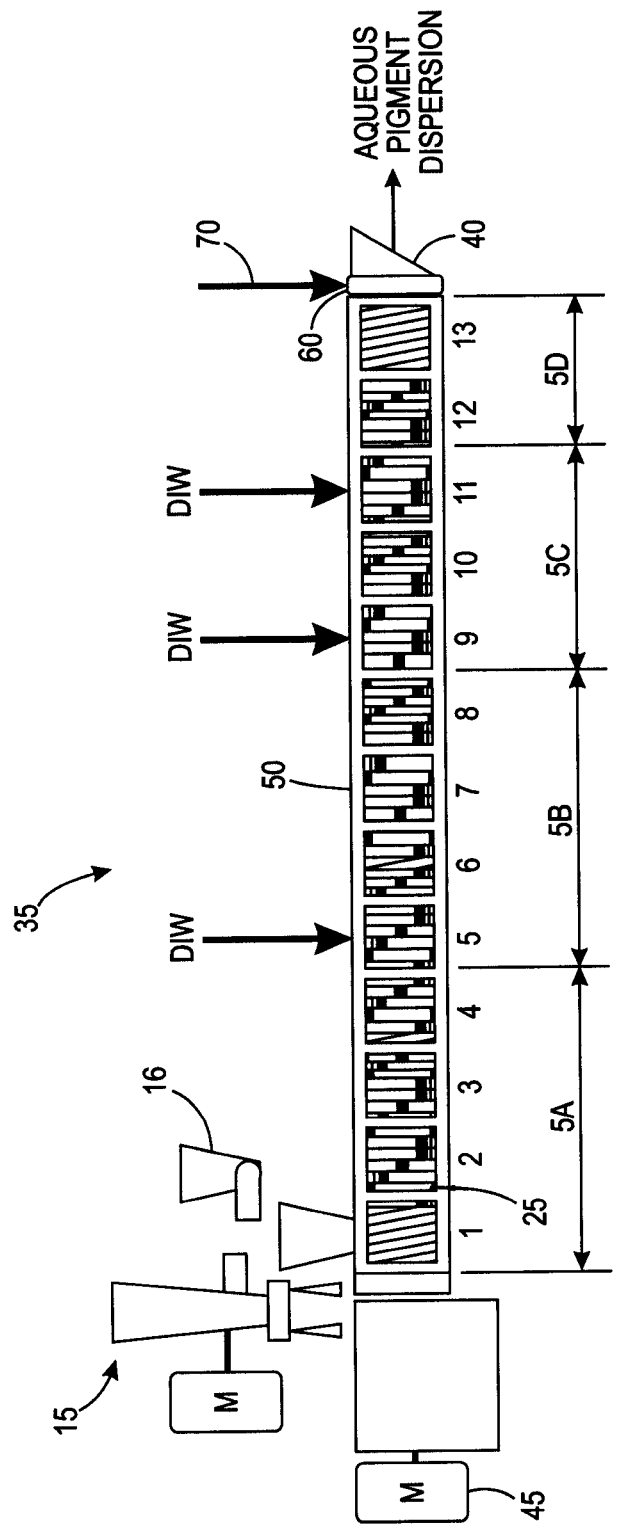

METHOD OF CONTINUOUSLY FORMING AN AQUEOUS COLORANT DISPERSION USING A SCREW EXTRUDER

BACKGROUND

This disclosure relates to a continuous process for preparing an aqueous pigment dispersion. The aqueous pigment dispersion may be used, for example, to form toner compositions.

Toner utilized in development in the electrographic process, also known as a xerographic process, is generally prepared by chemical toner processes, in which nanometer size emulsion polymer and latex is mixed with a color pigment and other toner components during an aggregation process, followed by a coalescence process. A thermoplastic binder resin may be used in the aggregation process and may be several known polymers, such as polystyrenes, styrene-acrylic resins, styrene-methacrylic resins, styrene-butadiene resins, polyesters, epoxy resins, acrylics, urethanes and copolymers thereof. Carbon black is a common pigment used for toner compositions. Colored pigments such as red, blue, green, cyan, magenta, yellow, brown, and mixtures thereof, may also be used. Other toner components may be included, for example, wax and charge enhancing additives.

There are known processes and devices for preparing toner components used in toner compositions. For example, processes for producing resin emulsions useful in producing toners are described in U.S. Pat. No. 8,207,246 to Faucher et al., filed on Jun. 26, 2012, and U.S. Patent Application Publication No. 2011/0196066 to Faucher et al., filed on Feb. 5, 2010, the disclosures of which are totally incorporated herein by reference.

Current processes for preparing aqueous pigment dispersions for use, for example, in toner compositions, are performed in a batch process. Accordingly, because each individual batch process involves the handling of bulk amounts of material, each process takes many hours to complete before moving to the next process. In addition, batch-to-batch consistency is frequently difficult to achieve because of large variations of temperature, shear field, pumping capacity, and the like, throughout the stirred batch tank. Furthermore, it is difficult to scale-up the batches due to different batch reactions. The batch process also requires constant attention as an entire batch may have to be aborted if the batch process is out of control in terms of temperature, impeller speed, and the like.

Therefore, there is a need for processes with improved dispersion of toner components used in preparing toner compositions. In addition, there is a need for processes that provide more control of the particles produced, including maintaining quality, uniformity and size, without the extensive time and energy used in more conventional methods.

SUMMARY

Described herein is a continuous process for making a pigment dispersion, the continuous process including continuously feeding a pigment into a feed section of a screw extruder at a controlled rate, continuously feeding a surfactant into the feed section of the screw extruder at a controlled rate, continuously feeding water downstream of the feed section to emulsify the pigment and the surfactant, forming a water-in-pigment dispersion, continuously feeding additional water downstream of the previously fed water to cause a phase inversion of the water-in-pigment dispersion, forming a pigment-in-water dispersion, continuously homogenizing the pigment-in-water dispersion in the screw extruder to create a homogenous aqueous pigment dispersion, and collecting the homogenous aqueous pigment dispersion from an exit section of the screw extruder.

Also described herein is a method including continuously feeding a colorant into a feed section of a screw extruder at a controlled rate, continuously feeding a surfactant into the feed section of the screw extruder at a controlled rate to form a pre-dispersion, emulsifying an aqueous solution in the pre-dispersion in the screw extruder to create a water-in-colorant dispersion, phase inverting the water-in-colorant dispersion to create a colorant-in-water dispersion in the screw extruder, homogenizing the colorant-in-water dispersion to create a homogeneous colorant dispersion in the screw extruder, and collecting the homogenous aqueous colorant dispersion through an exit portion of the screw extruder.

In addition, an aqueous pigment dispersion formed by the processes described above is described herein.

BRIEF DESCRIPTION OF THE DRAWING

FIG. 1 is a diagram of a screw extruder that may be used in accordance with the processes described herein.

EMBODIMENTS

The term "emulsion" refers, for example, to a dispersion of one liquid in a second immiscible liquid. "Dispersion" refers, for example, to a mixture of two substances, for example a solid and a liquid, one of which is finely divided and dispersed in the other. A "pre-dispersion" refers, for example, to a stage of mixing the two substances before they reach a sufficient degree of dispersion in one another to be considered a dispersion. "Homogenizing" refers, for example, to the manner of breaking particles down mechanically until they are consistently dispersed or distributed throughout a liquid.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Described herein is a continuous process for making a colorant dispersion.

In FIG. 1, a schematic diagram of the process for creating a colorant dispersion is shown. The process uses a screw extruder 35, shown as a multi-screw extruder, into which a colorant is fed into the feed section of the screw extruder. The screw extruder 35 comprises at least one feeder or feed line 15 for feeding the colorant and 16 for the surfactant into the screw extruder. For example, the feeder may be a hopper.

The colorant is continuously fed into the screw extruder 35 at a controlled rate, for example, through a colorant feeder 15. The colorant may be in a solid phase such as, for example, a pellet or powder form when fed into the screw extruder.

In addition, the process described below refers to a pigment. However, various suitable colorants of any color can be used to in the process described herein, including pigments, dyes, and mixtures thereof.

Generally, pigments and dyes that may be used are black, cyan, magenta, yellow, red, green, brown, or blue pigments or dyes, and mixtures thereof, including REGAL 330®; (Cabot), Acetylene Black, Lamp Black, Aniline Black; magnetites, such as Mobay magnetites MO8029™, MO8060™;

Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP604™, NP608™; Magnox magnetites TMB-100™, or TMB-104™. Other colorants include, for example, phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™, and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Examples of magentas that may be selected include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Other colorants are magenta colorants of Pigment Red PR81:2 and CI-45160:3. Illustrative examples of cyans that may be selected include copper tetra(octadecyl sulfonamido)phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellows that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Forum Yellow SE/GLN, Cl Dispersed Yellow 33 2,5-dimethoxy-4-sulfonanilide phenylazo-4'-chloro-2,5-dimethoxy acetoacetanilides, and Permanent Yellow FGL, PY17, CI 21105, and known suitable dyes, such as red, blue, green, Pigment Blue 15:3 C.I. 74160, Pigment Red 81:3 C.I. 45160:3, and Pigment Yellow 17 C.I. 21105, and the like. Other colorants are disclosed, for example, in U.S. Pat. No. 5,556,727, the disclosure of which is totally incorporated herein by reference.

A surfactant may be fed into the extruder through the same feed line as the colorant, or through a separate feed line. For example, the surfactant is continuously fed at a controlled rate, for example, through a separate surfactant feed line 16 to a same single entry point into the extruder. Alternatively, the surfactant may be continuously and simultaneously fed with the colorant into the colorant feeder. The surfactant may be in a solid phase such as, for example, in powder or pellet form when fed into the extruder. One advantage of using a surfactant in a solid form is that it eliminates extra process steps to make a surfactant solution, which increases productivity. In addition, using a surfactant in a solid form has a surprising and unexpected result that the particle size and size distribution of the formed colorant dispersion becomes closer to what is achieved through batch production with a solid surfactant than with liquid surfactant, which improves the quality of the dispersion. Furthermore, by using a surfactant in solid form, the feed rate could be increased at the reduced screw speed of the extruder, which in turn, increases productivity while simultaneously reducing wear and tear of the process equipment.

The surfactants may be selected from any suitable surfactant for the selected colorant, for example including ionic surfactants and nonionic surfactants. Both anionic surfactants and cationic surfactants are encompassed by the term "ionic surfactants." The surfactant may be added in an amount of from about 0.01% to about 5% by weight of the colorant, for example from about 0.75% to about 4% by weight of the colorant, such as from about 1% to about 3% by weight of the colorant.

Examples of nonionic surfactants that may be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenac as IGEPAL CA-210TH, IGEPAL CA-520™, IGEPAL CA720™, IGEPAL CO-890™, IGEPAL CO720™, IGEPAL CO-290™, IGEPAL CA-210™, ANTAROX 890™, and ANTAROX897™. Other examples of suitable nonionic surfactants include a block copolymer of polyethylene oxide and polypropylene oxide, including those commercially available as SYNPERONIC PE/F, such as SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN®, NEOGEN SC™ obtained from Daiichi Kogyo Seiyaku, combinations thereof, and the like. Other suitable anionic surfactants include, for example, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized.

Examples of the cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™, and ALKAQUAT™, available from Alkaril Chemical Company, SANIZOL™ (benzalkonium chloride), available from Kao Chemicals, and the like, and mixtures thereof.

The colorant and surfactant may be fed into the feed section of the screw extruder at any suitable rate to continuously produce an aqueous colorant dispersion. For example, the colorant and surfactant may be fed into the feed section of the extruder at a rate of, for example, about 1 lb/hr to about 10 lbs/hr, from about 2 lbs/hr to about 8 lbs/hr, or from about 3 lbs/hr to about 7 lbs/hr. The rates described above represent the combined amount of colorant and surfactant being fed through the feed section and into the screw extruder.

After being fed into the feed section of the screw extruder 35, the colorant and surfactant pass through a mixing section 5A of the screw extruder. In this section of the screw extruder, the colorant is mechanically broken to break apart any agglomerated particles, and the colorant and surfactant are mixed to form a pre-dispersion.

Downstream of the mixing of the dry components, the pre-dispersion enters a water-in-colorant formation section 5B of the screw extruder. In the water-in-colorant formation section 5B of the screw extruder, an aqueous solution, for example, water, such as deionized water (DIW in FIG. 1), is fed into the screw extruder 35. The aqueous solution may be fed into the screw extruder 35, for example, by injection. For example, the aqueous solution may be injected into the screw extruder 35 at a controlled rate through a pressurized feed pump. The pre-dispersion mixes with the aqueous solution and emulsifies with the aqueous solution, forming a water-in-colorant dispersion. The colorant, surfactant, and aqueous solution are continuously mixed and/or dispersed as the mixture passes through this section.

The aqueous solution may be fed into the screw extruder at any rate necessary to form a water-in-colorant dispersion. For example, the aqueous solution may be fed at a rate of about 10 g/min to about 70 g/min, from about 20 g/min to about 60 g/min, or from about 30 g/min to about 50 g/min.

Downstream of the creation of a water-in-pigment dispersion, the water-in-colorant dispersion enters colorant-in-pigment formation section 5C of the screw extruder 35. In the colorant-in-pigment formation section 5C of the screw extruder, a second aqueous solution may be fed into the screw extruder 35. This aqueous solution may be the same as or different from the previously fed aqueous solution. For example, the aqueous solution may be water. The water may be, for example, deionized water. The aqueous solution may be fed into the screw extruder 35, for example, by injection. For example, the aqueous solution may be injected into the screw extruder 35 at a controlled rate through a pressurized feed pump. The additional feeding of the aqueous solution causes a phase inversion of the water-in-colorant dispersion. The dispersion thus changes from a water-in-colorant dispersion to a colorant-in-water dispersion in this section of the extruder. The colorant, surfactant, and aqueous solution are continuously mixed and/or dispersed as the mixture passes through this section.

The aqueous solution may be injected at any rate necessary to cause the phase inversion. For example, the aqueous solution may be fed at a rate of about 30 g/min to about 90 g/min, from about 40 g/min to about 80 g/min, or from about 50 g/min to about 70 g/min.

The feeding of the second aqueous solution to cause phase inversion may be separated into two separate feedings, wherein one feeding is downstream of the other, and it is the downstream second feeding of water forms the colorant-in-water dispersion. One skilled in the art would be able to determine when the second feeding should be separated into two feedings based on the formulation of the colorant, the feed rate of the components, and the mixing speed of the screw extruder.

This additional aqueous solution introduced in this section may be the same as or different from the previously fed aqueous solution. For example, as described above, the aqueous solution may be water, for example, such as deionized water. The aqueous solution may be fed into the screw extruder 35, for example, by injection. For example, the aqueous solution may be injected into the screw extruder 35 at a controlled rate through a pressurized feed pump. The aqueous solution may be fed into the screw extruder at a rate of, for example, about 60 g/min to about 120 g/min, from about 70 g/min to about 110 g/min, or from about 80 g/min to about 100 g/min.

After forming the colorant-in-water dispersion, the colorant-in-water dispersion continues down the screw extruder 35 and enters into a fourth section called the homogenizing section 5D in which homogenization of the colorant-in-water dispersion takes place. In this homogenizing section 5D, the colorant and surfactant continues to mix downstream to form a homogenous aqueous dispersion.

The formed homogenous aqueous dispersion is then collected at the end 40 of the screw extruder 35. Optionally, as the dispersion exits the screw extruder, the homogenous aqueous dispersion passes through a filter or screen 60. The filter or screen is able to filter out particles above a desired size range.

The filter or screen may optionally be equipped with an automatic changer and pressure transducer 70. The automatic changer changes the filter or screen attached to the screw extruder in response to a change in pressure detected by the pressure transducer. One skilled in the art is aware of how to select appropriate screens, filters, automatic changers, and pressure transducers for the desired homogenous aqueous dispersion being produced.

As discussed above, the screw extruder 35 used with the method described herein comprises at least one feeder for feeding the colorant and the surfactant into the screw extruder. For example, the feeder may be a hopper. The screw extruder 35 also comprises a barrel 50, at least one screw 25, for example, two screws, at least one heater (not shown), and temperature control thermocouples (not shown) for controlling temperatures. The screw shaft is connected to a motor 45 through a gear box (not shown) to turn the screw. Screw speed may be controlled in this manner. The barrel 50 provides housing for the screw(s), which are used for mixing, dispersing, emulsifying, and homogenizing during the process described herein. Both the barrel 50 and screw 25 may be segmented. The barrel 50 may be a segmented barrel and the segments may be independently heated and controlled. For example, the barrel 50 and screw 25 may be segmented into 13 segments.

Each section described above may be comprised of separate, individual segments of the screw extruder. The individual segments may be grouped together to design the screw sections described above. Generally, the individual sections formed by grouping the segments are heated or cooled to the same temperature and have the same screw speed. However, the individual sections may be separately and independently heated or cooled to a desired temperature. In other words, each section may be heated to a temperature that is different from or the same as any of the other sections. For example, each section may be heated to a temperature of from about 25° C. to about 110° C., from about 30° C. to about 105° C., or from about 35° C. to about 100° C. Because the screw extruder 35 is segmented and the temperature of each section can be heated and controlled separately, the processing temperature control is much easier and accurate, unlike large batch stirred tanks, which involve heating and controlling very large masses at the same time. The ability to set different temperature profiles along the barrel of the screw extruder allows much better control of particle size and uniformity, which is not achieved in batch processes.

The screws may be rotated at any speed necessary to form the aqueous pigment dispersion. For example, the screws may be rotated at a speed of from about 100 rotations per minute (rpm) to about 1000 rpm, for example, from about 200 rpm to about 800 rpm, or from about 300 rpm to about 600 rpm.

EXAMPLE

A co-rotating intermeshing twin screw extruder (ZSK25) was used for this example (Example).

6.6 lb/hr of color pigment (Carbon Black R330) in powder form (primary particle size 200-300 nm) and 0.44 lb/hr of surfactant powder (Tayca BN2060) were introduced into a hopper, and then co-fed from the hopper at a ratio of 15:1 into the feed section of the screw extruder at a rate of 6.6 lbs/hr into the screw extruder to create a pre-dispersion. Segments 1-11 of the screw extruder were heated to a temperature of about 40° C., segment 12 was heated to about 70° C., and segment 13 was heated to about 100° C. The screws were rotated at a speed of about 450 rpm.

At the first aqueous solution injection point, located in segment 4, deionized water (DIW) was injected at a rate of 40 g/min. As the mixture of water, surfactant, and colorant flowed through the extruder, the components were mixed to create a water-in-pigment dispersion. After creation of the water-in-pigment dispersion, more DIW was injected at a second aqueous solution injection point in section 9 downstream of the first aqueous injection point at a rate of 65 g/min to begin to cause phase inversion of the water-in-pigment dispersion. The water-in-pigment dispersion continued to mix and flow through the screw extruder to a third aqueous solution injection point in segment 11 that is downstream from the first and second aqueous solution injection point. Here, DIW was injected at a rate of 90 g/min to cause phase inversion of the water-in-pigment dispersion to a pigment-in-water dispersion. As the pigment-in-water-dispersion continued to flow through the screw extruder, the pigment-in-water-dispersion was further homogenized. The homogenized dispersion then exited the extruder through an automatic screen changer to filter any coarse particles that remained, and the homogenized dispersion was collected. The homogenized dispersion that was collected at the end of the extruder had a solid concentration of 17.5%.

The solid concentration has determined by the pigment concentration in the total mass, that is, the pigment feed rate divided by the sum of surfactant and total water injection rate (6.6*100/(0.44+30.76)). A Microtrac Nanotrac is used to the determine particle size distribution of suspended pigment particles. The size distribution measurement is accomplished by using a laser light-scattering technique, which allows for the measurement of the Doppler-shifted light generated from each particle in motion (Brownian Motion). The signals generated by these shifts are proportional to the size of the particle. These signals are then captured and mathematically converted to the particle size distribution. The results of the measurement are shown in Table 1.

For comparison, the results obtained for the above-described experiment were compared to the results of Example 2 of U.S. Patent Application Publication No. 2008/0138738 to Chung et al., filed on Nov. 21, 2006 (Chung) (Comparative Example). In Example 2 of Chung, a continuous process was used to create a colorant pigment dispersion, except that the surfactant used was a 2% solution of Tayca BN2060, the screw speed was 1,000 rpm, and the pigment was fed into the extruder at a rate of 2.2 lbs/min. The resultant pigment dispersion made a solid concentration of 10%.

The results of the Example and the Comparative Example were compared to the particle size obtained from a batch process (NIPX-BK27) (Control).

TABLE 1

| Sample | D50 (nm) | D95 (nm) | MV (nm) | MN (Nm) |
| --- | --- | --- | --- | --- |
| Control | 142.3 | 244.2 | 149.5 | 107.7 |
| Example | 138.4 | 242.6 | 145.7 | 98 |
| Comparative Example | 150.4 | 272.5 | 154.7 | 119.2 |

As shown in Table 1, when a solid surfactant is used to form the colorant dispersion, the average particle size of the composition surprisingly and unexpectedly decreases to be closer to that of the Control. In addition, both the number average (MN) and the weight average (MV) surprisingly and unexpectedly decreases to be closer to that of the control.

Therefore, the results of the comparison indicate that using a surfactant in a solid form results in at least the following surprising and unexpected results: (1) an extra process step to make a surfactant solution is eliminated, thereby increasing productivity and reducing costs, (2) the feed rate of the colorant may be increased from 2 lbs/hr to 6.6 lbs/hr, thereby increasing productivity, (3) the screw speed may be substantially decreased from 1,000 rpm to about 450 rpm, thereby reducing wear and tear of the equipment, and (4) the particle size and size distribution become closer to what is achieved through batch production with a solid surfactant than with liquid surfactant, which improves the quality of the aqueous colorant dispersion.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A continuous process for making a pigment dispersion, the continuous process comprising:
   continuously feeding a pigment into a feed section of a screw extruder at a controlled rate in the absence of a solvent;
   continuously feeding a surfactant in solid form into the feed section of the screw extruder at a controlled rate in the absence of a solvent;
   continuously feeding water downstream of the feed section at a rate of 40 g/min to 65 g/min to emulsify the pigment and the surfactant, forming a water-in-pigment dispersion;
   continuously feeding additional water downstream of the previously fed water at a rate of 65 g/min to 90 g/min to cause a phase inversion of the water-in-pigment dispersion, forming a pigment-in-water dispersion having a solid content that is less than a solid content of the water-in-pigment dispersion;
   continuously homogenizing the pigment-in-water dispersion in the screw extruder to create a homogenous aqueous pigment dispersion; and
   collecting the homogenous aqueous pigment dispersion from an exit section of the screw extruder.

2. The process of claim 1, wherein the feed section includes a first feed line for the pigment and a second feed line for the surfactant.

3. The process of claim 1, wherein the water and the additional water fed into the screw extruder is de-ionized water.

4. The process of claim 1, wherein the screw extruder includes a screen and an automatic screen changer, wherein the homogenous aqueous pigment dispersion passes through the screen as it exits the screw extruder.

5. The process of claim 1, wherein the pigment and surfactant are each in a solid form when fed into the feed section.

6. The process of claim 5, wherein the surfactant is in a powder form.

7. The process of claim 1, wherein the screw extruder is segmented.

8. The process of claim 7, wherein each segment is independently heated to a temperature of from about 25° C. to about 110° C.

9. The process of claim 7, wherein the extruder includes 13 segments.

10. The process of claim 1, wherein the feeding of additional water is separated into two separate feedings, one feeding is downstream of the other, wherein the downstream second feeding of water creates the pigment-in-water dispersion.

11. A method comprising,
continuously feeding a colorant into a feed section of a screw extruder at a controlled rate in the absence of a solvent;
continuously feeding a surfactant in solid form into the feed section of the screw extruder at a controlled rate to form a pre-dispersion in the absence of a solvent;
emulsifying an aqueous solution into the pre-dispersion in the screw extruder to create a water-in-colorant dispersion;
phase inverting the water-in-colorant dispersion to create a colorant-in-water dispersion in the screw extruder such that the colorant-in-water dispersion has a solid content that is less than a solid content of the water-in-colorant dispersion;
homogenizing the colorant-in-water dispersion to create a homogeneous colorant dispersion in the screw extruder; and
collecting the homogenous aqueous colorant dispersion through an exit portion of the screw extruder.

12. The method of claim 11, wherein the homogeneous colorant dispersion is filtered as it exits the screw extruder.

13. The method of claim 11, wherein the surfactant and the colorant are each in a solid phase when fed into the feed section.

14. The method of claim 13, wherein the solid phase of the surfactant is a powder form.

15. The method of claim 13, wherein the feed section includes a first feed line for the colorant and a second feed line for the surfactant.

16. The method of claim 11, wherein the screw extruder is segmented, and each segment is independently heated or cooled to a temperature of from about 25° C. to about 110° C.

17. The method of claim 11, wherein the screw extruder is a multi-screw extruder.

18. The method of claim 11, wherein the aqueous solution is water.

19. The method of claim 11, wherein the feeding of additional water is separated into two separate feedings, one feeding is downstream of the other, wherein the downstream second feeding of water creates the colorant-in-water dispersion.

20. An aqueous pigment dispersion, formed by the continuous process of claim 1, wherein an average particle size of a pigment in the aqueous pigment dispersion is about 138 nm.

* * * * *